United States Patent [19]

Prosdocimi et al.

[11] Patent Number: 5,607,889
[45] Date of Patent: Mar. 4, 1997

[54] PROCESS FOR PRODUCING AN ACTIVE COMPOSITE AND ACTIVE COMPOSITE PRODUCED BY THIS PROCESS

[75] Inventors: Jacques Prosdocimi, Canohes; Bernard Spinner, Corneilla Del Vercol, both of France

[73] Assignee: Elf Aquitaine, France

[21] Appl. No.: 374,868

[22] Filed: Jan. 19, 1995

[30] Foreign Application Priority Data

Jan. 19, 1994 [FR] France .................................. 94 00513

[51] Int. Cl.⁶ .............................. B01J 20/20; B01J 8/02; F25B 37/00
[52] U.S. Cl. .................... 502/80; 62/324.1; 165/104.12; 165/905; 252/69; 252/378 R; 502/60; 502/410
[58] Field of Search ................................. 264/109, 122; 62/324.1; 165/1, 104.12, 905; 237/2 B; 252/69, 378 R; 423/448; 502/60, 64, 80, 406, 410, 411, 413, 416, 417

[56] References Cited

U.S. PATENT DOCUMENTS

| | | |
|---|---|---|
| 4,692,425 | 9/1987 | Schneider et al. ........................ 502/81 |
| 5,059,568 | 10/1991 | McCauley .................................. 502/65 |
| 5,086,022 | 2/1992 | Roca et al. ................................ 502/60 |
| 5,283,219 | 2/1994 | Mauran et al. .......................... 502/417 |

FOREIGN PATENT DOCUMENTS

| | | | |
|---|---|---|---|
| 2461687 | 2/1981 | France .............................. B01J 20/20 |
| 4140455 | 6/1993 | Germany ......................... B01J 20/02 |

*Primary Examiner*—David A. Simmons
*Assistant Examiner*—Kenneth M. Jones
*Attorney, Agent, or Firm*—Bacon & Thomas

[57] ABSTRACT

Process for producing an active composite consisting of a support and an active agent is disclosed. The process comprises mixing expanded graphite and an exfoliated lamellar compound, compressing the mixture to form a support which has a graphite density between 0.02 and 0.5 kg/dm³, and impregnating the support with the active agent. Such active composites are employed as reactants in thermochemical systems.

7 Claims, 1 Drawing Sheet

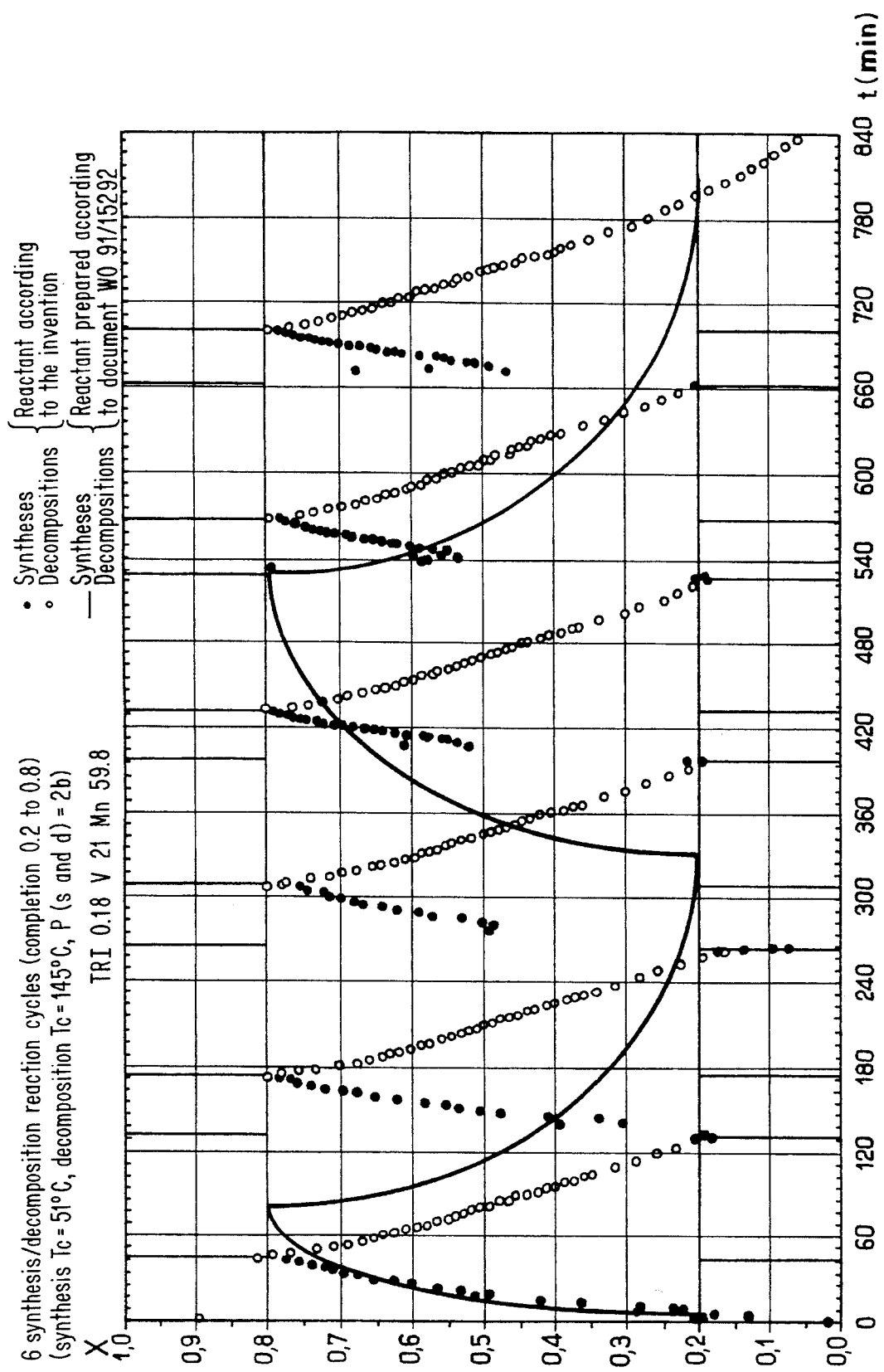

PROCESS FOR PRODUCING AN ACTIVE COMPOSITE AND ACTIVE COMPOSITE PRODUCED BY THIS PROCESS

BACKGROUND OF THE INVENTION

1. Field of the Invention

The present invention relates to a process for producing an active composite consisting of a support and of an active agent. The support is porous and chemically inert, so as to allow interactions between the active agent, dispersed in the support, and a gaseous or liquid flow. The present invention also relates to such an active composite.

This active composite is designed to be employed exclusively in thermochemical systems.

2. Description of Related Art

In the field of chemical heat pumps based on the thermodynamics of the reaction between a solid and a gas, or of the adsorption of a gas on a solid, use is made of a mixture of a divided material such as expanded graphite and of a solid reactant, for example a salt, or, respectively, of an adsorbent such as a zeolite. The mixture of expanded graphite and of this solid, which is the site of a chemical reaction or of a physical adsorption, exhibits numerous advantages during a chemical reaction or a physical adsorption between the solid and a gas. The expanded graphite, which is in the form of flakelets, has a very large specific surface and allows the gas to diffuse even in a confined environment. In addition, the heat conductivity of the mixture is high.

In document WO 91/15292 it has been proposed to produce an active composite by preparing a support made up of a block of recompressed expanded graphite which is then impregnated from the outside, for example, with a solution of a salt, the impregnated support being subsequently dried to produce the active composite. The active composite thus made has a heat conductivity which is markedly higher than that of the expanded graphite in flakelet form, while retaining a high porosity to gas flows.

Despite undeniable advantages, the active composite prepared by the process described in document WO 91/15292 is not entirely satisfactory. In fact, when the active composite is employed for containing a salt and forming the site of a chemical reaction with a gas, the absorption of the gas into the salt causes an expansion of the volume of the salt crystals, resulting in a deformation of the graphite flakelets around the crystals. In addition, during a desorption of the gas the salt crystals contract. The physical attraction between the crystals and the graphite flakelets causes a deformation of these flakelets when the crystals contract.

This type of active composite finds a use in thermochemical systems in which a block of the composite is arranged in a metal vessel, the wall of the block being in contact with an exchanger, this wall being external to the block in contact with an exchanger-reactor or, on the contrary, internal in contact with exchanger tubes passing through the block. In the gas desorption phase the contraction of the crystals and the deformation of the flakelets give rise to a general contraction of the block, as a result of which the wall of the block becomes detached from the interior of the vessel. This greatly reduces the coefficient of heat transfer between the block and the vessel.

Document FR-A-2626496 describes a process for improving the characteristics of absorption and desorption of a gas by a reaction medium in which the reaction mixture, consisting of a salt, is mixed with expanded graphite and a second expanded product of rigid structure and high penetrability. This second product includes an exfoliated hydrated lamellar mineral, for example vermiculite or perlite.

The mixture described in document FR-A-2626496 is in the form of a low-density powder and contains the salt in pulverulent form. In this document it is not envisaged to recompress the pulverulent mixture in order to form a block of reactant such as that described in document WO 91/15292. However, if an attempt were to be made to form such a block from the pulverulent mixture of document FR-A-2626496, this block would suffer the disadvantages described above, because the salt particles in this mixture, being dispersed both between the flakelets of expanded graphite and between the lamallae of vermiculite, would give rise to the same deformation of the structure during the adsorption and desorption of the gas, as a result of the presence of salt particles in the graphite flakelets.

SUMMARY OF THE INVENTION

The subject of the present invention is an active composite which is capable of accommodating the changes in volume of the active agent which it contains.

For this purpose, the invention proposes a process for producing an active composite consisting of a support and of an active agent, comprising the stages of:

mixing expanded graphite and an exfoliated lamellar compound,
recompression of the mixture in order to form a support which has a graphite density of between 0.03 and 0.5 kg/dm$^3$,
impregnation of the support with the active agent.

The stage of impregnation of the active agent in the support preferably includes the stages of:

preparation of a solution of the active agent;
immersion of the support in the solution; and
drying of the impregnated support.

In addition, the invention proposes an active composite produced by using the process according to the present invention, including a support made up of a mixture of expanded graphite and of an exfoliated lamellar compound, and an active agent, characterized in that it includes, by weight:

10 to 80% of active agent,
2 to 20% of exfoliated lamellar compound,
10 to 90% of expanded graphite, the total of the components being equal to 100%.

BRIEF DESCRIPTION OF THE DRAWING

The FIGURE of drawing is a graph of six synthesis/decomposition reaction cycles for a reactant prepared in accordance with the invention and a reactant prepared according to WO 91/15292.

DETAILED DESCRIPTION OF THE PREFERRED EMBODIMENTS

"Exfoliated lamellar compound" is intended to mean the products obtained from exfoliated hydrated lamellar minerals. These products may be especially vermiculite, perlite or products obtained by exfoliation, in particular from oxides of the $SiO_2 \cdot Al_2O_3$ type (clays). The group of kandites (7 Å flakelet thickness) and of illites (10 Å flakelet thickness) is less advantageous than the smectites and than the vermiculite group (flakelet thickness from 14.5 to 15 Å). Only the vermiculites have the property of being expanded so considerably.

The exfoliated lamellar compound preferably includes vermiculite, a hydrated aluminium magnesium silicate.

A result of the special porous structure of the exfoliated lamellar compound is that, during the impregnation of the support with the active agent, the latter is preferentially bound onto the exfoliated lamellar compound by virtue of its very high absorption capacity for the solution. During the drying, the active agent crystallizes within the exfoliated lamellar compound and not between the flakelets of expanded graphite. As a result, the active composite according to the invention does not exhibit the disadvantages of that described in document WO 91/15292.

Other characteristics and advantages of the present invention will appear more clearly on reading the description below, given with reference to the attached drawing, in which the single FIGURE shows the curves for synthesis/decomposition reactions as a function of the time for a gas absorption employing the product according to the invention and a compound of the prior art as reaction site.

According to a first aspect of the invention, a process for producing an active composite in which the support includes expanded graphite and vermiculite and the active agent contains a salt is carried out as follows:

A support which has the form of a block with a graphite density of between 0.03 and 0.5 kg/dm$^3$ is produced from a mixture of pulverulent expanded graphite of relative density between 0.0001 and 0.02 and of vermiculite in the form of particles which have a particle size of between 1 mm and 5 mm, this mixture being recompressed in order to form the block. Next, a solution, saturated or otherwise, of the salt to be employed is prepared and then the block is immersed in the solution. As a result of the extremely porous structure of the vermiculite the solution is absorbed preferentially by the vermiculite and infiltrates only to a small degree into the interstices of the expanded graphite. Thus impregnated, the block is next dried, and this results in the crystallization of the salt between the flakelets of the vermiculite, with a very small percentage of the salt crystallizing between the graphite flakelets.

EXAMPLE I

A mixture is prepared, containing, by weight, 48% of expanded natural graphite, with a relative density of 0.01, and 52% of vermiculite with a particle size of between 1 mm and 5 mm. This mixture is recompressed in a plunger-cylinder assembly in order to form a support in which the apparent density of the graphite is 0.18 kg/l. The resulting block is next impregnated with a saturated solution of $MnCl_2$ in order to form an active composite so that, after the block is dried, the composition in % by weight is 59.5% of $MnCl_2$, 21% of vermiculite and 19.5% of natural graphite.

The single FIGURE shows curves of progress of a reaction as a function of time for a sample of active composite produced according to this example and for a sample prepared according to document WO 91/15292, containing the same percentage of $MnCl_2$.

Each sample employed was a cylinder of active composite, of diameter equal to 15 cm and 10 cm in height, provided with an axial passage for the diffusion of the gas.

The sample was arranged in a reaction chamber comprising heat exchangers at the periphery.

The test conditions were the following:

$NH_3$ pressure: 2 bars
Temperature of the heat-transfer fluid:
   during the synthesis of $MnCl_2.2NH_3$ into $MnCl_2.6NH_3$= 51° C.
   during the decomposition of $MnCl_2.6NH_3$ into $MnCl_2.2NH_3$=145° C.

The successive cycles shown in the FIGURE were performed with a degree of completion of the reaction of 0.2 to 0.8 which, on average, corresponds to a synthesis of $MnCl_2.2.8NH_3$ to $MnCl_2.5.2NH_3$ and a decomposition of $MnCl_2.5.2NH_3$ to $MnCl_2.2.8NH_3$.

As can be seen in the FIGURE, the rates of synthesis and of decomposition are markedly higher in the case of the sample prepared according to the invention.

Additional tests have shown an excellent reproducibility of the rates of synthesis and of decomposition of the reactants.

The process according to the invention can be employed with many different active agents such as those proposed, for example, in Table I. An active agent is intended to mean, for example, a solid reactant, a solid adsorbent or a liquid absorbent.

TABLE I

| Nature of the active agent-gas interaction | Active agents | Gas |
| --- | --- | --- |
| Solid-gas reactions (reversible) | halides pseudohalides carbonates sulphates nitrates | water $NH_3$ and derivatives (amines) |
| | oxides | $CO_2$ $SO_2$ $SO_3$ |
| | metals metal alloys metal hydrides | $O_2$ $H_2$ hydrocarbons $H_2$ |
| Liquid-gas absorption (reversible) and saturated liquid-gas absorption (reversible) | aqueous solutions halides pseudohalides carbonates sulphates nitrates | water |
| | solutions in liq. $NH_3$ halides pseudohalides carbonates sulphates nitrates | $NH_3$ and derivatives |
| Solid-gas adsorption (reversible | zeolite active carbon silica gel phosphorus pentoxide | water methanol and derivatives |

In the case of chlorides, Table II specifies the nature of impregnating liquids in which the active agent is dissolved or suspended.

TABLE II

| Active agent | Impregnating liquid | |
|---|---|---|
| | for solution | for suspension |
| $CaCl_2$ | water or alcohol, acetone | |
| $MnCl_2$ | alcohol | ether, liquid $NH_3$ |
| $BaCl_2$ | alcohol | |
| $NiCl_2$ | alcohol, $NH_4OH$ | liquid $NH_3$ |
| $CuCl_2$ | acetone | |
| $CoCl_2$ | alcohol, acetone, ether | |
| $SrCl_2$ | alcohol, acetone | liquid $NH_3$ |
| NaCl | glycerine | |
| $FeCl_2$ | alcohol, acetone | ether |
| $NH_4Cl$ | alcohol, liquid $NH_3$ | acetone, ether |
| $CdCl_2$ | alcohol | acetone, ether |

It is possible to prepare active composites according to the invention including, by weight from 10 to 80% of active agent,
from 2 to 20% of lamellar expanded compound, and
from 10 to 90% of expanded graphite, the total of the components being equal to 100%.

The production of an active composite from an exfoliated lamallar compound, as described above, has the result of allowing the composite to absorb the changes in volume of the salt which take place during chemical reactions with a gas. A block of active composite is no longer subject to damage such as that exhibited in the known reactant blocks. The contact between a block of active composite according to the invention and the wall of a reactor chamber into which the block is tightly fitted remains close even after a long series of reactions. The heat transfer between the block and the wall is therefore maintained at a high level.

We claim:

1. Process for producing an active composite for use as a reagent material in thermochemical systems, said composite consisting of a support and an active agent, comprising the steps of:

mixing expanded graphite and an exfoliated lamellar compound to form a mixture of these materials, compressing the mixture in order to form a support which has a graphite density between 0.02 and 0.5 kg/dm$^3$, and impregnating the support with active agent whereby the active agent is preferentially bound onto the exfoliated lamellar compound.

2. Process according to claim 1, wherein the step of impregnating the support with the active agent comprises the steps of:

preparing a solution of the active agent, immersing the support in the solution, and drying the impregnated support.

3. Active composite produced by using the process of claim 1, including a support made up of a mixture of expanded graphite and an active agent, wherein said composite comprising, by weight:

10 to 80% of active agent, 2 to 20% of exfoliated lamellar compound, 10 to 90% of expanded graphite, the total of the components being equal to 100%.

4. Process according to claim 1, wherein said exfoliated lamellar compound is a member selected from the group consisting of vermiculite, perlite and exfoliated $SiO_2 \cdot AL_2O_3$ clays.

5. Process according to claim 1, wherein said active agent is a salt.

6. Process according to claim 5, wherein said salt is $MnCl_2$.

7. Process for producing an active composite for use as a reagent material in thermochemical systems, said composite consisting of a support and an active agent, comprising the steps of:

mixing expanded graphite and vermiculite to form a mixture of these materials, compressing the mixture in order to form a support which has a graphite density between 0.02 and 0.5 kg/dm$^3$, and impregnating the support with active agent whereby the active agent is preferentially bound onto the vermiculite.

* * * * *